United States Patent [19]

Beam et al.

[11] Patent Number: 4,762,379
[45] Date of Patent: Aug. 9, 1988

[54] BLOW MOLDED PANELS AND A MOLD AND METHOD OF MAKING THEM

[75] Inventors: John W. Beam, Princeton; Richard M. Latino, Holden, both of Mass.

[73] Assignee: Wright Line Inc., Worcester, Mass.

[21] Appl. No.: 864,030

[22] Filed: May 16, 1986

[51] Int. Cl.[4] ............................................. A47B 88/00
[52] U.S. Cl. ................................ 312/320; 312/330 R
[58] Field of Search ............... 312/311, 330, 320, 328, 312/336

[56] References Cited

U.S. PATENT DOCUMENTS

| | | |
|---|---|---|
| 900,276 | 10/1908 | Geffers . |
| 1,759,667 | 5/1930 | Stay ...................................... 312/328 |
| 2,535,688 | 12/1950 | Lowther ............................. 312/328 |
| 3,000,058 | 9/1961 | Thielen, Jr. ......................... 264/465 |
| 3,058,153 | 10/1962 | Busch . |
| 3,293,697 | 12/1966 | Balint .................................. 425/441 |
| 3,767,281 | 10/1973 | Adams ............................ 312/330 R |
| 3,856,256 | 12/1974 | Celesti ................................. 249/66 |
| 4,090,757 | 5/1978 | Frey et al. ........................... 312/320 |
| 4,209,160 | 6/1980 | Vanotti ................................ 249/162 |
| 4,287,150 | 9/1981 | Gendron ............................. 264/538 |
| 4,337,025 | 6/1982 | Pagels et al. ........................ 425/392 |
| 4,383,670 | 5/1983 | Olschewski et al. ................. 249/60 |
| 4,476,913 | 10/1984 | Leuner et al. ...................... 164/346 |
| 4,486,379 | 12/1984 | Wilkie et al. ....................... 264/526 |

FOREIGN PATENT DOCUMENTS

| | | |
|---|---|---|
| 568243 | 12/1958 | Canada . |
| 1190619 | 4/1965 | Fed. Rep. of Germany . |
| 3036727 | 5/1982 | Fed. Rep. of Germany ...... 312/320 |
| 54-138071 | 10/1979 | Japan ........................................ 23/3 |

Primary Examiner—Joseph Falk
Attorney, Agent, or Firm—Milton E. Gilbert; James W. Mitchell

[57] ABSTRACT

There is disclosed a hollow, blow molded plastic panel for door and drawer fronts for storage cabinets having a recessed handle (16) of substantial keystone configuration in a surface (2). Also disclosed is a mold having a movable core insert (58) for forming the handle and a method of molding.

12 Claims, 6 Drawing Sheets

BLOW MOLDED PANELS AND A MOLD AND METHOD OF MAKING THEM

FIELD OF THE INVENTION

This invention relates to the manufacture of blow molded panels for office furniture, which panels can be used interchangeably as either doors or drawer fronts on storage cabinets and the like.

BACKGROUND OF THE INVENTION

Office furniture, such as storage cabinets that have doors, drawers, or combinations of both, have historically been made of sheet metal or wood. However, the majority of cabinets made today are of sheet metal because they are less expensive than wooden cabinets and wooden cabinets are heavier and more difficult to move. Metal cabinets also afford better fire protection for documents stored in them.

Typically, handles used for opening the doors or drawers of storage cabinets are frequently recessed. There are many reasons for this, two of the more obvious being: to avoid handles which protrude to prevent their being broken off while moving the cabinet and also to prevent people from injuring themselves if they brush against a projecting handle.

Contrary to the safety value of recessed handles, they are generally not very attractive. Thus, there exists a need for more aesthetic storage cabinets which retain the utility of recessed handles and provide the quality of a metal cabinet for securing documents.

SUMMARY OF THE INVENTION

The invention resides in a hollow blow molded plastic panel for either doors or drawer fronts for storage cabinets and the like, as well as in a mold for making the panel and a method of making the panel.

The panel comprises a front wall and a rear wall which is spaced from the front wall. The walls are joined by sides, a top, and a bottom thereby enclosing at least one hollow interior portion, although there may be more than one hollow interior portion. A recessed handle is formed in the front wall which has is substantially keystone shape in cross section. The keystone configuration is wider toward the rear wall than is the opening of the handle which is in the front wall. The keystone shaped handle is formed by a first elongated wall extending from the front wall to the rear wall and a second elongated wall, which is spaced from the first elongated wall, and which also extends from the front wall to the rear wall. The first and second walls diverge away from each other in the direction from the front wall to the rear wall, thereby forming the keystone shape opening in the front wall.

The keystone opening blends into the front wall by diagonal walls diverging away from each other from the rear wall to the front wall at the ends of the handle. They also blend with the first and second elongated walls.

The panel also includes at least one and, preferably a number, of depressions in the rear wall which extend to the front wall where they are fused to the front wall to give the panel rigidity. The panel is also provided with various depressions on the rear wall to create locations for the attachment of hardware. The panel may also include a continuous elongated depression in the rear wall running lengthwise of the panel to create a groove to accept mechanical tracking and timing mechanism.

At the intersection where the first and second elongated walls join the front wall, there may be undercuts for the acceptance of indicia cards which can indicate what is contained within the drawer or behind the door, the panels being adaptable as either a storage cabinet door or a cabinet drawer front.

The panel is made from a mold which includes a first and second mold plate which are movable into engagement with each other to create a mold cavity. A mold insert or core projects through the first mold plate into the cavity and a portion of the mold core is made in the shape of a keystone. The core is made of first and second core members which are movable relative to each other along a common plane. One of the core members has a molding surface formed parallel to the common plane which separates the two core members. After the panel has been molded within the mold, the first core member is moved relative to the second by sliding it outwardly of the cavity along the common plane and the mold surface to facilitate release of the molded panel from the mold including the core. The invention also contemplates that the first core member be movable and the second core member be stationary relative to the front and back mold plates. The invention also contemplates that portions of the mold plates be interchangeable to produce various size panels without changing the core member which is more economic than producing a separate mold for each size panel with its own core member.

The first and second core members may each be formed with a second flat surface lying in a common plane parallel to and spaced from the first common plane whereby wear, resulting from the sliding motion of the two core members, is distributed between the two parallel planes. The core members may be formed with a void extending lengthwise of the common planes with steps functioning as stop surfaces on each of the core members thereby to restrict the amount of movement of one member relative to the other in a direction outwardly of the mold cavity.

The mold plates, as well as the core members, may be formed with projections contiguous with the lines of intersection thereby to blend or harmonize any witness line created by the intersection of mold elements with intentional or functional configurations on the molded article.

The method of making a blow mold article, which has an undercut recess of substantially keystone cross section formed in a surface, comprises the steps of providing a mold cavity and a mold core which is substantially keystone shaped. The mold core is separated into first and second parts along a common plane. On one of the core parts, there is formed a mold surface which is parallel to the common plane separating the mold core parts.

The core is inserted into the cavity and a tube of semi-molten blow moldable material, known as a parison, is dropped between the mold plates. The tube is pinched off and sealed and partially inflated with air pressure. The mold plates close around the parison which is then expanded into the confines of the cavity including the core.

Upon completion of the molding step, the first core, i.e., the one having the surface on it parallel to the common plane, is slid relative to the second part outwardly of the cavity. Thereafter, the blow mold article is removed from the cavity including the core.

The above and other features of the invention including various novel details of construction and combinations of parts will now be more particularly described with reference to the accompanying drawings and pointed out in the claims. It will be understood that the particular "blow molded panel and a mold and method of making it" embodying the invention is shown by way of illustration only and not as a limitation of the invention. The principles and features of this invention may be employed in varied and numerous embodiments without departing from the scope of the invention.

DETAILED DESCRIPTION OF THE INVENTION

Figure 1:
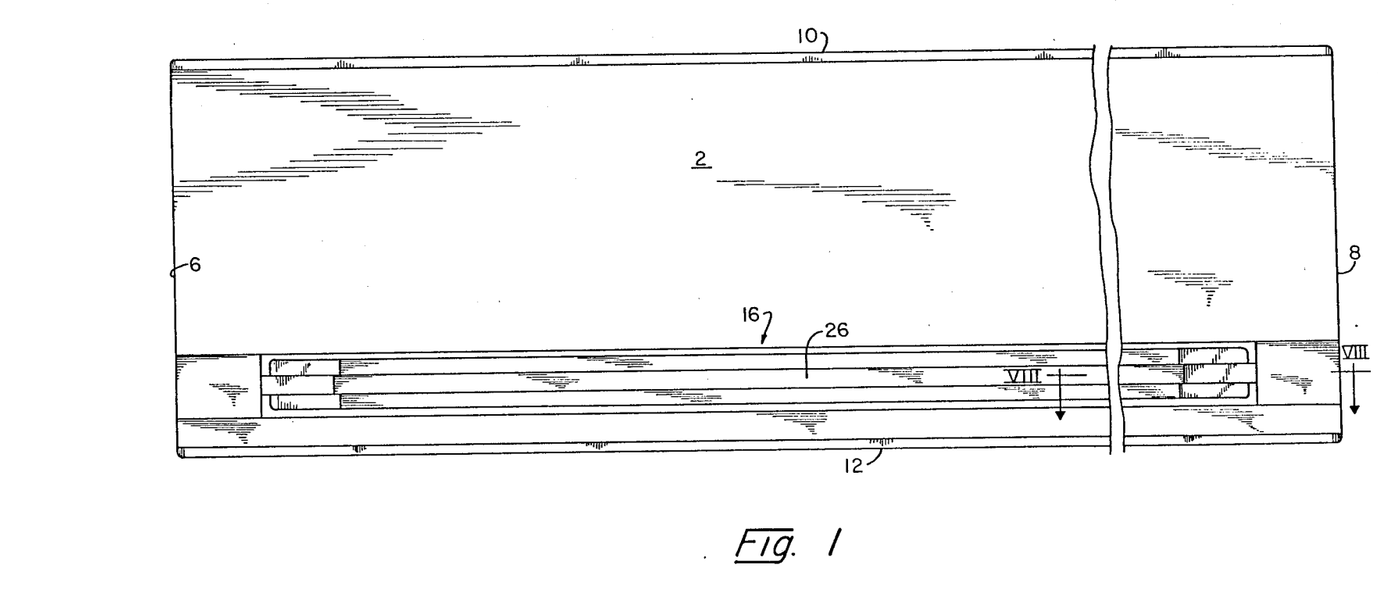
FIG. 1 is a front elevation of a blow molded panel made in accordance with the invention.
Figure 2:
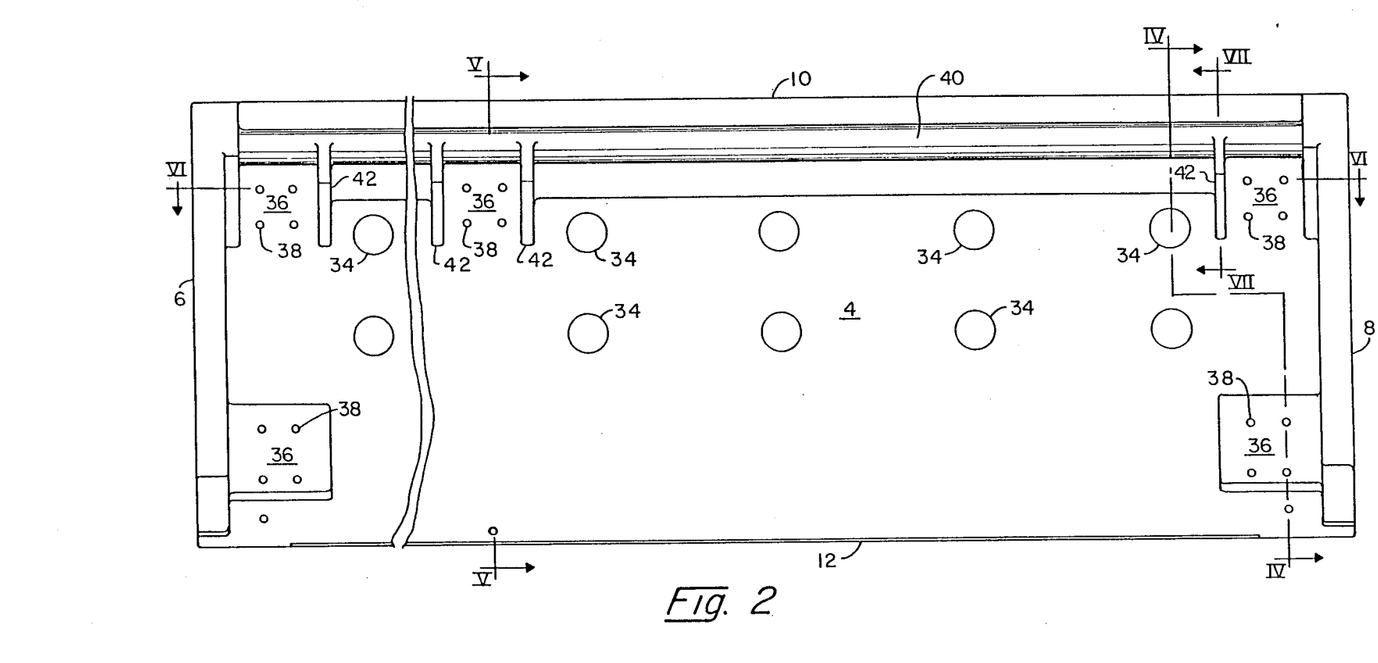
FIG. 2 is a rear elevation of the panel shown in FIG. 1.
Figure 3:
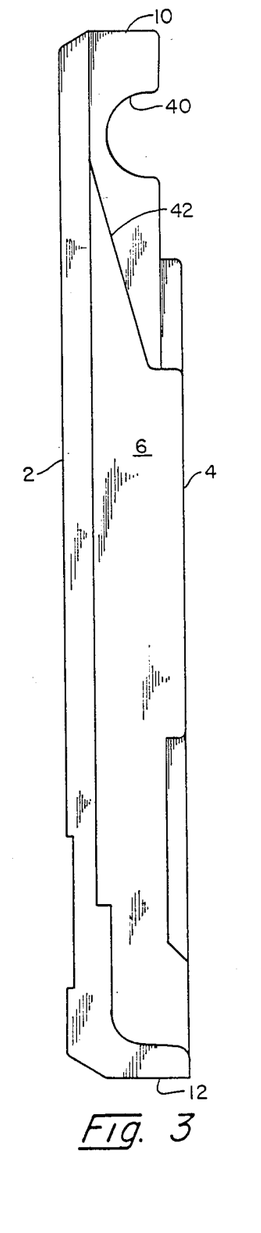
FIG. 3 is a right side elevation of the panel.
Figure 4:
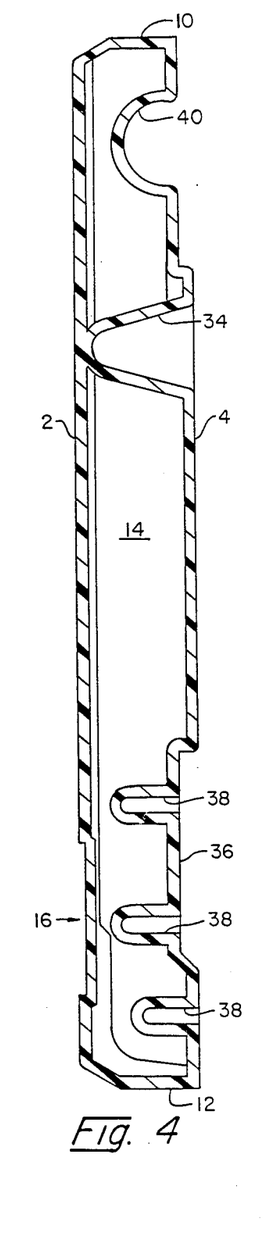
FIG. 4 is a sectional view taken on the line IV—IV on FIG. 2.
Figure 5:
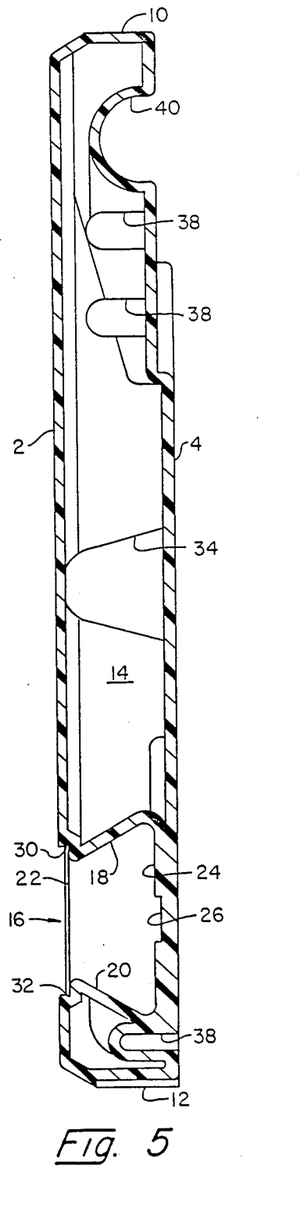
FIG. 5 is a section taken on the line V—V on FIG. 2.
Figure 6:
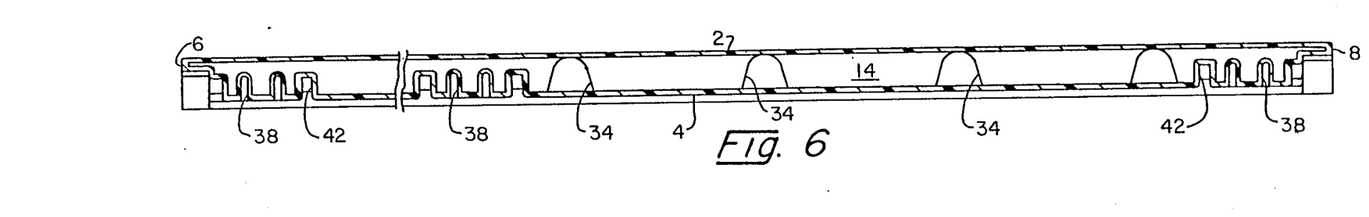
FIG. 6 is a section taken on the line VI—VI on FIG. 2.

FIG. 1 is a front view of a hollow blow molded plastic panel which may be used interchangeably as a door or drawer front for storage cabinets. The panel has a front wall 2 and rear wall 4 which is shown in FIG. 2. As will be seen in sectional in FIGS. 4 and 5, the front and rear walls are separated from each other. The front and rear walls are joined by sides 6 and 8, a top 10, and a bottom 12, thereby enclosing at least one hollow interior portion 14 (FIGS. 4 and 5). Other interior portions of the hollow panel are created by various elements which project inwardly from the walls as will be explained in more detail hereinafter.

A recessed handle, generally indicated 16, is formed in the lower portion of the front wall and extends horizontally thereof substantially from side to side. As will be seen in FIG. 5, the recessed handle is substantially keystone shape in cross section. It is formed by a first elongated wall 18 which extends from the front wall 2 to the rear wall 4 and a second elongated wall 20 spaced from the first elongated wall and which also extends from the front wall to the rear wall. The first and second elongated walls 18 and 20 diverge away from each other, as viewed in cross section, in the direction from the front wall 2 to the rear wall 4, thereby forming the keystone configuration.

The open portion 22 of the handle 16 which is in the front wall 2, is narrower than the portion 24 which is at the rear wall 4. A longitudinal depression 26 runs lengthwise of the handle at the rear walls substantially lengthwise of the handle.

Figure 8:
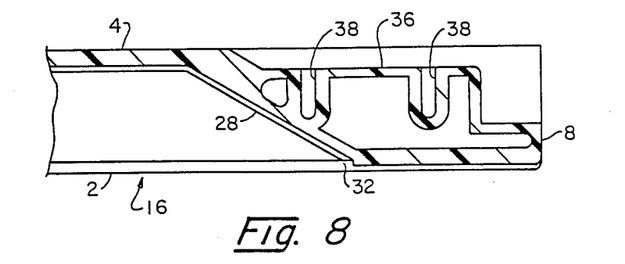
FIG. 8 is a section taken on the line VII—VII on FIG. 1.

The ends of the recessed handle terminate in the front wall by diagonal walls 28 (one of which is seen in FIG. 8). The diagonal walls diverge away from each other from the rear wall 4 to the front wall 2 and are joined to the first and second elongated walls 18 and 20. By this configuration, the handle blends with the front wall. Being of substantially keystone configuration, the handle may be easily grasped by a person's fingers either under the first elongated wall 18 or on top of the second elongated wall 20.

Undercuts 30 and 32 extend horizontally along the location where the first and second elongated walls 18 and 20 of the handle 16 join the front wall 2. The undercuts permit the insertion of indicia cards or labels which may be used to identify the contents of the drawer or door of which the panel forms a portion.

Depressions 34, which may be seen in FIGS. 2, 4, and 5, are formed in the rear wall 4 and extend to the front wall 2 where they are fused to give the panel rigidity.

As will be seen in FIGS. 2 and 4, at various locations 36 in the rear wall 4, there are depressions to create locations for the attachment of hardware. The configuration of the depressions and their locations may vary in accordance with the intended use of the panel. Circular depressions 38 are also formed in the rear wall which may serve as sockets for screws or other fasteners securing hardware to the panel.

Figure 7:
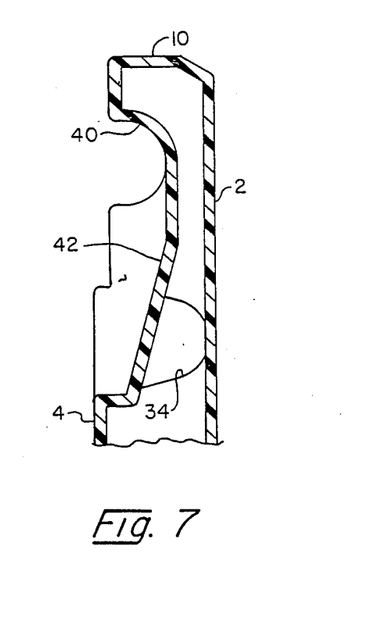
FIG. 7 is a section taken on the line VII—VII on FIG. 2.

As will be seen in FIGS. 2 and 7, contiguous with the elongated depression 40 are inwardly extending ribs 42 which add rigidity to the structure.

A continuous elongated depression 40 is formed in the rear wall which creates a groove for the acceptance of assembly hardware, and more particularly, for a pivot shaft which would be employed when the panel is used as a door front which pivots upwardly. It will be appreciated that the particular panel herein shown is for illustrative purposes only and other similar panels embodying the invention may be made either larger or smaller and with differing configurations depending upon their intended use and the hardware that is to be attached to them.

Figure 9:
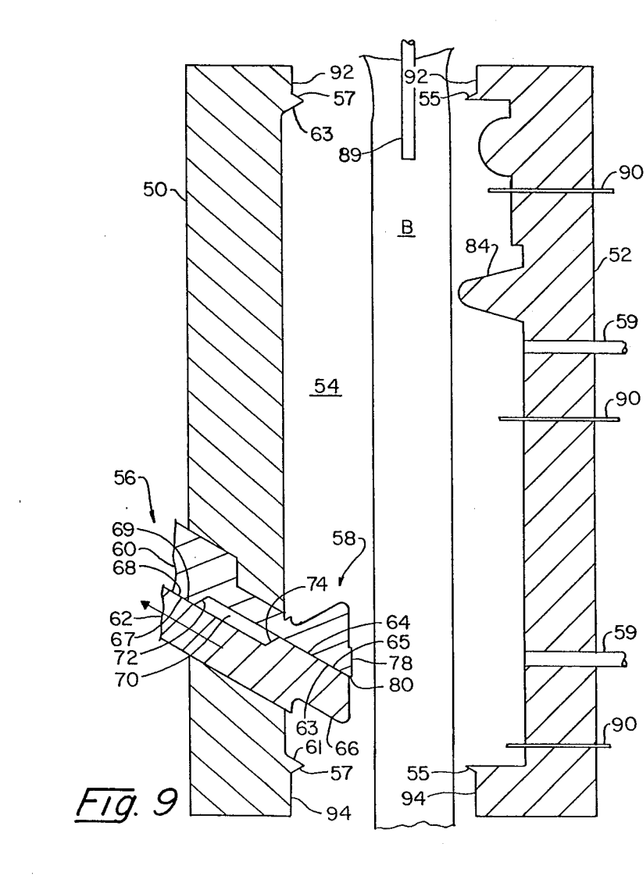
FIG. 9 is a schematic view, in section, of a mold for making a panel embodying features of this invention, the mold being shown in open position.
Figure 10:
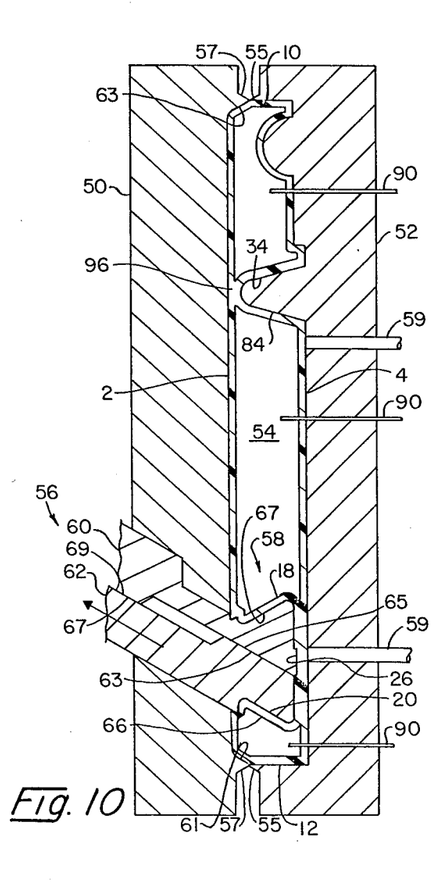
FIG. 10 is a view similar to FIG. 9 with the mold in closed position.

Referring next to FIGS. 9 and 10, there will be seen a mold for forming the hollow blow molded plastic panel. The mold includes a first mold plate 50 and a second mold plate 52 which are movable into engagement with each other to create a mold cavity, generally designated 54. The plates include pinchers 55 and 57 seen adjacent the upper and lower portions of the cavity 54. The pinchers extend around the entire mold cavity. Ejector pins 59 are slidable through the mold plate 52. A mold core, generally designated 56, projects through the first mold plate 50 into the cavity 54. As will be seen, the mold core 56 has a portion 58 which is substantially keystone shape. The mold core 56 includes first and second core members 60 and 62 which are movable relative to each other along a common plane 64. In practice, the first core member 64 is held stationary and the second core member 62 is movable relative to it. The core members 60 and 62 are made with flat surfaces 63 and 65 which mate along the common plane 64.

The second core member 62 has a molding surface 66 which is parallel to the plane 64 along which the mold core members are slidable. The first core member 60 has a mold surface 67. The lower pincher 57 on the plate 50 has a surface 61 which is parallel to the plane 64 and the upper pincher 57 has a surface 63 which is parallel to the surface 67. The molding surfaces 66 and 67 form part of the keystone configuration of the mold core.

The core members 60 and 62 are formed with second flat surfaces 67 and 69 lying in a common plane 68 which is parallel to and spaced from the first plane 64. The core members slide along both of the parallel planes. A void 70 is formed between the surfaces forming the common planes 64 and 68 and at the ends of the voids, there are parallel stop surfaces 72 and 74 which, when engaged, limit the amount of movement between the core members 60 and 62. In the position shown in FIG. 9, where the core members are fully extended, the void 70 exists and when the core member 62 is subsequently withdrawn in the direction of the arrow, the void 70 will be closed and surfaces 72 and 74 will abut.

The first or upper core member 60 has a projection 78 which is contiguous with the intersection 80 between the core members at the common plane 64. Not only does the projection 78 create the decorative depression 26 in the rear wall of the recessed handle of the finish molded panel but it also serves to disguise any witness line in the finished product which might occur at the intersection 80 of the core members.

The second mold plate 52 is provided with a plurality of projections, such as that shown at 84 in FIG. 9, which form the various recesses 34, 38, and 42 (only one such projection being shown in FIG. 9). Blow needles 90 project through the second mold plate and their function will be described in more detail hereinafter.

The blow molded panel, herein above described, is made by the following method. The mold plates 50 and 52 are withdrawn from each other and assume the positions shown in FIG. 9. The second core member 62 is slid relative to the upper core member 60 in a direction opposite to the arrow shown in FIG. 9 until the members assume the position therein shown. The mold surfaces are coated with a mold release and a hollow parison of semimolten molding plastic is extruded downwardly from an extruder and occupies the position shown in FIG. 9. One blow moldable material found to be satisfactory for the parison is NORYL ® by the General Electric Company. It produces a product combining the qualities of stiffness, texture, color stability, and flame resistance, all of which contribute to its value for blow molding a panel used as a door or the drawer of a storage cabinet. Other materials having similar qualities, however, may be used.

The mold plates 50 and 52 are then moved toward each other thereby creating the mold cavity 54. In the process, the pinchers 55 and 57 engage and pinch off the top and bottom of the parison. The parison is then semi-inflated by air pressure from a blow pin 89. In moving from the FIG. 9 to the FIG. 10 position, the projection 84 forces portions of the inner surfaces of the semi-inflated parison together as shown at 96 in FIG. 10 whereby this area will fuse and a depression 34 will thereby be formed in what will become the rear wall 4 of the panel. The keystone portion 58 of the mold core 56 will then be positioned very close to what will become the rear wall 4 of the panel, fusing opposite sides of the parison together against the rear wall 4. The parison is then expanded into the confines of the mold cavity and will surround the core portion 58 by air injected through the blow needles 90 which puncture the parison. Upon completion of the molding process, were it not for the fact that the members 60 and 62 of the core slide relative to each other and the fact that the surface 66 on the second core member 62 is parallel to the plane 64, it would be impossible to remove the core from the panel or, conversely, to remove the finished panel from the mold.

The mold plates 50 and 52 are then separated. The ejector pins 59 are activated to assist in separating the finished product from the mold plate 52 and keeping the core insert in the product. The core member 58 remains in the product until removed by an operator.

The core member 62 is then moved in the direction of the arrow in FIGS. 9 and 10, closing the void 70, the surface 66 sliding on the surface 67 (FIG. 10) that it created in the molding process. The surface 66, forms the elongated wall portion 20 of the recessed handle of the panel and the surface 67 from the surface 18. When the second core member 62 has been withdrawn, the operator removes the product by moving it upwardly and to the right as viewed in FIG. 10.

A second panel may then be made by lowering another parison of blow moldable material into the mold cavity and repeating the process.

Blow molded panels made in accordance with this invention have several advantages over conventional metal panels. They are easier and less expensive to produce and offer equivalent safety to articles stored within the cabinets to which they are attached.

The recessed keystone shape handle produces a desirable appearance in the front of the panel and is well adapted to being grasped, whether the panel be employed as a drawer front or a door.

We claim:

1. A panel for doors and drawer fronts for storage cabinets comprising:
   a single piece of hollow, blow molded plastic having a front wall and a rear wall spaced from the front wall, the walls being joined by integral sides, an integral top and an integral bottom thereby enclosing at least one hollow interior portion by the single piece of plastic,
   a recessed handle in the front wall having a substantially keystone cross section formed by a first elongated wall extending from the front wall to the rear wall,
   the recessed handle having ends terminating in the front wall at locations spaced from the sides and intersecting the front wall by diagonal walls diverging away from each other from the rear wall to the front wall and joined to the first and second elongated walls,
   and a second elongated wall spaced from the first elongated wall and extending from the front wall to the rear wall, the first and second walls diverging away from each other in the direction from the front to the rear wall thereby forming the recessed handle.

2. A blow molded panel according to claim 1 wherein there is at least one depression formed in the rear wall extending to the front wall where it is fused to give the panel rigidity.

3. A blow molded panel according to claim 1 wherein there are depressions in the rear wall to create locations for the attachment of hardware.

4. A blow molded panel according to claim 1 wherein there is a continuous, elongated depression in the rear wall creating a groove to accept mechanical tracking mechanism.

5. A blow molded panel according to claim 1 wherein there are under cuts extending along the location where the first and second elongated walls join the front wall.

6. A blow molded panel according to claim 1 wherein the panel is a storage cabinet door.

7. A blow molded panel according to claim 1 wherein the panel is a storage cabinet drawer front.

8. A storage cabinet having doors and drawer front of plastic panels,
   each panel comprising:
   a single piece of hollow, blow molded plastic having:
   a front wall and a rear wall spaced from the front wall, the walls being joined by integral sides, an integral top and an integral bottom thereby enclosing at least one hollow interior portion by the single piece of plastic,
   a recessed handle in the front wall having a substantially keystone cross section formed by a first elongated wall extending from the front wall to the rear wall,
   the recessed handle having ends terminating in the front wall at locations spaced from the sides and intersecting the front wall by diagonal walls diverging away from each other from the rear wall to the front wall and joined to the first and second elongated walls,
   and a second elongated wall spaced from the first elongated wall and extending from the front wall to the rear wall, the first and second wall portion diverging away from each other in the direction from the front to the rear wall thereby forming the recessed handle.

9. A storage cabinet according to claim 8 wherein there is at least one depression formed in the rear wall extending to the front wall where it is formed to give the panel rigidity.

10. A storage cabinet according to claim 8 wherein there are depressions in the rear wall to create location for the attachment of hardware.

11. A storage cabinet according to claim 8 wherein there is a continuous, elongated depression in the rear wall creating a groove to accept mechanical tracking mechanism.

12. A storage cabinet according to claim 8 wherein there are under cuts extending along the location where the first and second elongated walls join the front wall.

* * * * *